[11] 3,585,422

| [72] | Inventors | Pierre Burnier<br>St. Julien en Genevois;<br>François Berteaux, Laon, both of, France |
|---|---|---|
| [21] | Appl. No. | 882,086 |
| [22] | Filed | Dec. 4, 1969 |
| [45] | Patented | June 15, 1971 |
| [73] | Assignee | Societe Generale De Constructions<br>Electriques Et Mechaniques Alsthom<br>Paris, France |
| [32] | Priority | Dec. 6, 1968 |
| [33] | | France |
| [31] | | 177,118 |

[54] HOMOPOLAR DYNAMOELECTRIC MOTOR UTILIZING A MOVING, CONDUCTIVE FLUID
5 Claims, 5 Drawing Figs.

[52] U.S. Cl. .................................... 310/11,
    417/50
[51] Int. Cl. .................................... H02n 4/02
[50] Field of Search ............................. 310/11;
    103/1 M

[56] References Cited
UNITED STATES PATENTS

| 902,106 | 10/1908 | Northrup .................... | 103/1 X |
| 1,196,511 | 8/1916 | Borger ........................ | 310/11 |
| 2,652,778 | 9/1953 | Crever ........................ | 103/1 |
| 2,698,127 | 12/1954 | Bowlus ...................... | 230/1 |
| 2,850,652 | 9/1958 | Stanton ...................... | 310/11 |
| 3,320,443 | 5/1967 | Klein .......................... | 310/11 |
| 3,355,605 | 11/1967 | Okress ........................ | 310/11 |
| 3,450,904 | 6/1969 | Bidard ........................ | 310/11 |

*Primary Examiner*—D. X. Sliney
*Attorney*—Flynn & Frishauf

ABSTRACT: To provide for electrical contact to conductive fluid circulating in a magnetic field, and power transfer between an output shaft and the circulating fluid (the power transfer direction depending upon whether the machine operates as a generator, or as a motor), a fluid-type housing of insulating material is provided to have the fluid circulating therein, electrically conductive zones are located in the housing to provide electrical connection, and rotating blades in the form of paddle wheels, or the like, sealed against the outside are placed in the moving, conductive fluid. In one form, the housing is formed of circular, insulating discs with conductive cylindrical end walls and a conductive center, around which a super conducting magnet is placed; fluid ducts lead off from the center and a peripheral region of the discs; to turn the paddle wheels; in another embodiment, a toroidal, ring-shaped conduit is formed with magnets placed staggered along the duct, with conductive zone on facing, opposite sides of the duct offset from the magnets, the rotor and its blades being located in a bulge formed in the duct and in mechanical driving power transfer relationship to fluid circulating around the toroidal ring duct.

PIERRE BURNIER &
FRANÇOIS BERTEAUX,
Inventors

HOMOPOLAR DYNAMOELECTRIC MOTOR UTILIZING A MOVING, CONDUCTIVE FLUID

The present invention relates to homopolar dynamoelectric machines, and more particularly to such machines using a fluid as the rotating (armature) element, coupled to a hydraulic-mechanical power transfer device for the exchange of power between the moving fluid and a shaft of the power transfer device. Power can be transferred to the fluid, when it is to operate as a generator, and from the fluid when it is to operate as a motor. The fluid itself, in a duct, is subjected to a magnetic field.

Homopolar dynamoelectric machines are known since the days of Faraday; they do, however, present practical problems in their construction. Difficulties result in forming good contacts between the stationary and mobile parts of such apparatus.

Carbon-type brushes have a substantial voltage drop at the point of contact, and the current densities acceptable to such devices is comparatively low, for example approximately $10 A/cm.^2$ at a contact pressure of about $175 g./cm.^2$ and a linear operating speed of 25 m./s. Liquid contacts provide an improvement, particularly since the current density can be substantially increased, for example to the order of 200 $A/cm.^2$, with contact voltage drops in the order of a twentieth of a milliVolt, if mercury-indium amalgams are used. Liquid-type contacts do, however, have other problems: careful workmanship is required; problems with tightness, oxidation, and stability of amalgams arise. As an example, the mercury-indium amalgam will change, under certain conditions, into a powdery substance, and, further, the mercury only wets those substances well which it attacks.

It is an object of the present invention to provide a homopolar dynamoelectric machine in which the advantages of liquid contacts are retained, and the disadvantages avoided.

SUBJECT MATTER OF THE PRESENT INVENTION

Briefly, in accordance with the present invention, the conductor itself is a fluid located in a housing having tight walls which are at least partly electrically insulating. The conductive fluid can move inside the fixed housing in a magnetic field, which is cut by the conductive fluid. Fixed electrical contacts, which may be conductive zones, or separate contacts, are applied to the walls of the housing, to interconnect the conductive fluid with the exterior of the housing. They are located in such a way that the conductive fluid itself will form the armature of the machine. The moveable, conductive fluid is in power transfer relation to a mechanical power transfer device, such as paddle wheel blades, turbine blades or the like, in order to drive the blades, or to be driven thereby, depending upon whether the machine operates as a motor, or as a generator. Sealing of output shafts from the fluid is a matter well known in the art.

The mechanical power transfer device preferably is a rotor having paddle blades. When the machine operates as a dynamo dynamoelectric motors, the blades secured to the rotor are preferably shaped like turbine blades; to receive power from the moving fluid, when operating as a generator, the turbine blades are shaped like pump blades and, upon driving the shaft to which the pump blades are connected, movement will be imparted to the conductive fluid in the fixed housing. The housing itself may be a hollow toroid or ring, or a cylindrical body; and intense magnetic field is preferably provided, for example by super conductive magnets.

The invention will be described by way of example with reference to the accompanying drawings wherein.

Figure 1:
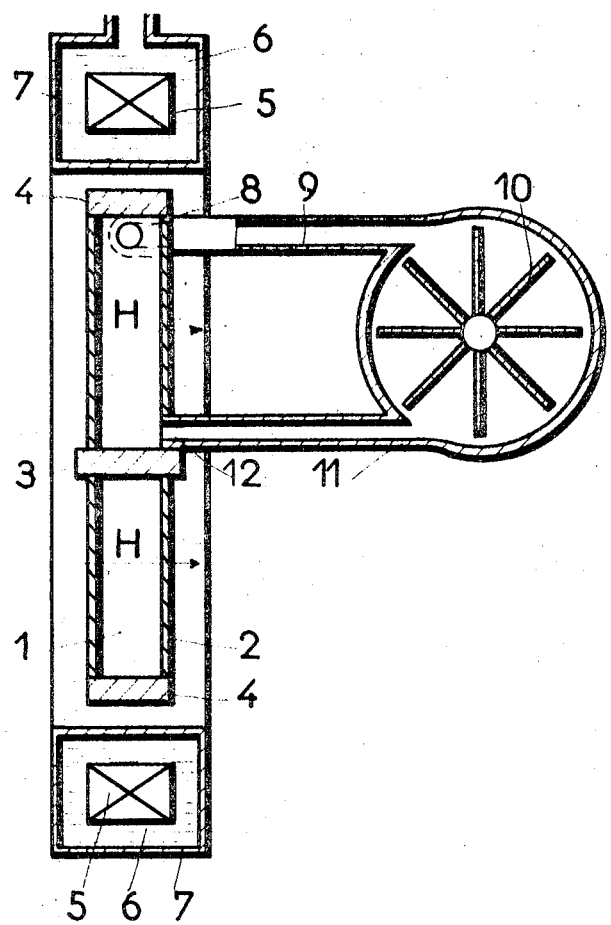
FIG. 1 is a schematic presentation of an embodiment of the present invention, utilizing a cylindrical housing.

A cylindrical housing 2 is formed by a pair of disc-shaped sidewalls of insulating material. In the center, the sidewalls have a cylindrical opening through which a metallic insert 3 can be placed, sealed in liquidtight manner to the cylindrical sidewalls of housing 2. Housing 2 has contained therein a free space 1 in which a conductive fluid, for example mercury, or a mercury-inndium compound or alloy is placed. The cylinder is closed off by an external, cylindrical wall 4 of conductive material. External electrical contacts can be connected to center 3 and conductive cylinder 4, by soldering, or other similar connecting means. The external circuit connections are not shown in the drawings and are standard in the art.

A super conductive magnet if formed by a winding 5, of suitable super conductive material, cooled in a suitable cryogenic fluid located in a cryogenic housing. The cooling fluid may, for example, be liquid helium, within a toroidal cryostat surrounding the outsider cylindrical, ring-shaped conductor 4, to provide a magnetic field H in an axial direction with respect to the housing 2. The outside, circumferential cover 4 has an orifice 8 formed therein, which is connected to a duct 9 leading to a reversible pump-turbine rotor schematically illustrated at 10. A return connection duct 11 connects with an orifice 12 placed in one of the sidewalls of housing 2, just adjacent and close to the center electrode 3.

OPERATION

Electromagnetic forces, caused by the axial magnetic field H and the radial current in the conductor 1, supplied by the conductive zones formed by electrode 3 and 4, cause the fluid within the space 1 to act like a rotor of a dynamoelectric machine, so that the fluid will turn at high speed in the interior of the housing formed by walls 2, electrode 4, and the center 3. Under centrifugal force, the liquid is ejected towards the turbine 10 by means of conduit 9, to be returned to the housing 2 by duct 11. Thus, transmission of mechanical power can be obtained from a shaft connected to turbine 10.

The system as illustrated has the advantage of liquid wetted contacts, without the problem of forming tight electrical connections in relatively moveable surfaces, since the electric contact elements 3, 4 are fixed to the insulating walls 2 to which they are attached. The separate magnetic coils, formed of super conductive material, can provide a strong, intense magnetic field.

The embodiment illustrated in FIG. 2 again provides open space 1 within which a conductive fluid is located. Blades 13 are secured to a center shaft 14 which traverses the sidewalls 2', made of insulating material. Metallic shoes 15, fixed, and in sector form are located in the form of a crown on each side of the sidewalls 2' of the housing. The insulating walls carry, along with a center, a fluidtight, moveable joint sealing shaft 14 against the sidewalls, while permitting rotation thereof. This is a well-known problem which can readily be solved in accordance with well-known constructions, not shown in detail since rotating, sealed joints are known. The pressure of fluid at the shaft side is low since, due to centrifugal force, the maximum fluid pressure against the housing will be exerted at the outside, that is in the region of the outside closure, formed by conductor 4.

Figure 3:
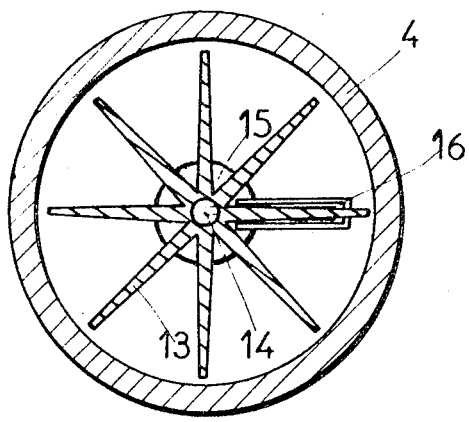
FIG. 3 is a cross-sectional view along lines III–III of FIG. 2.

The conductive blades 13 may be of either insulating material, or conductive material. If the blades are made of insulating material, the surfaces thereof preferably have wires of good-conductive material secured thereto, such as wires 16 secured thereto; these wires are seen in FIG. 3 on one of the blades only, for clarity. Wire 16 may be secured thereto with clearance, or may be cast or embedded in the material of the blades, secured at their extremities in radial direction to the blades. They will contact the conductive fluid within space 1 and decrease the resistance against rotation without substantially increasing losses due to stray currents. Additionally, such wires tend to decrease turbulence since they form virtual partitions within the compartment, thus decreasing losses due to fluid friction.

Figure 2:
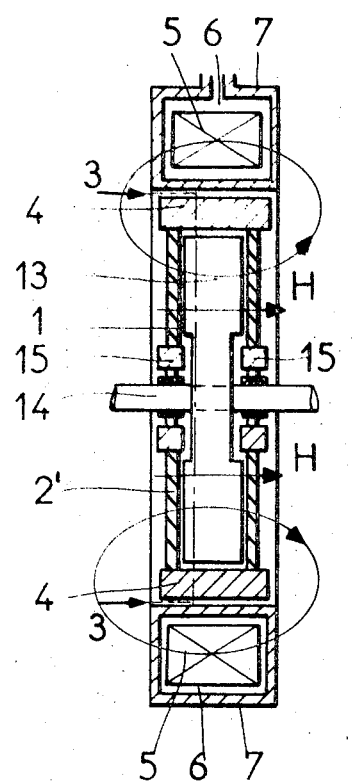
FIG. 2 is a more detailed, cross-sectional view of a structure similar to that of FIG. 1.

The operation of the embodiment illustrated in FIG. 2 is the same as that in FIG. 1, except that the turbine (or pump) elements are formed by the blades 13, and is incorporated in the same interior housing in which the fluid is retained. The blades 13 may turn in any type of conductive fluid. A super conductive coil 5, within a cryostat 7 bathed by a cryogenic fluid 6 surrounds the outside closure 4, providing a magnetic field H. Lines of force, cutting the conductors, are also illustrated.

The rotor may be cooled by exteriorly circulating the fluid within which it operates, utilizing the centrifugal force of the fluid in the housing itself.

It is apparent, of course, that more than one rotor, and more than one blade assembly may be placed on the same shaft. The voltage of operation of the device can be increased by subdividing the sector-shaped conductors 15 into various sectors, subdividing the outside conductors 4 into various sectors, and suitably interconnecting the sectors in known manner.

Figure 4:
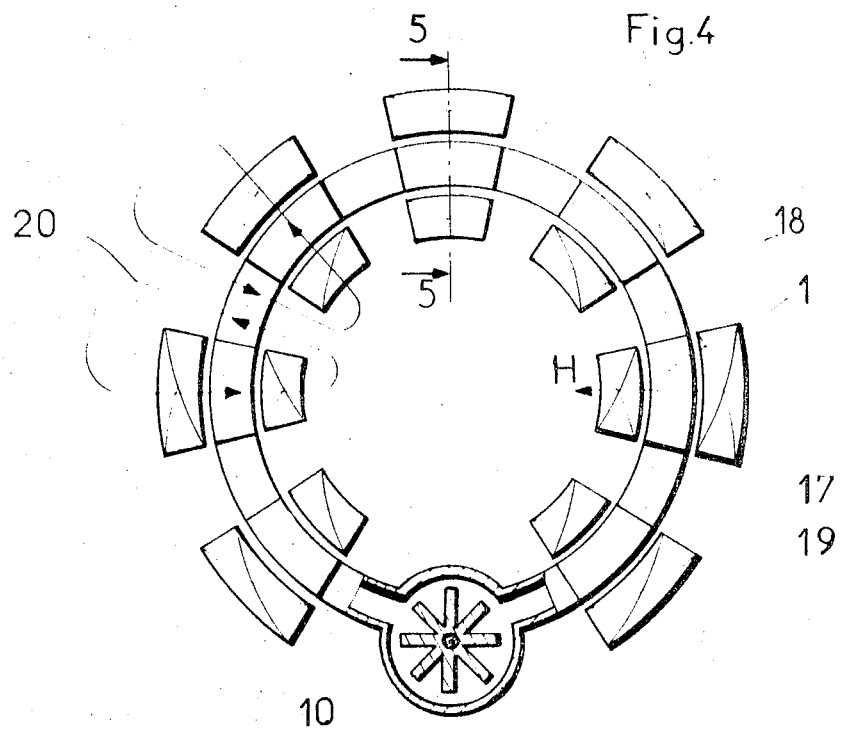
FIG. 4 is a schematic top view of a different embodiment of the present invention.
Figure 5:
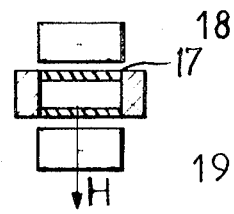
FIG. 5 is a sectional view along lines V–V of FIG. 4.

FIGS. 4 and 5 illustrate a different embodiment of the present invention, in which the liquid is contained within a ring-shaped toroidal space 1″, contained in an annular insulating housing 17 having a rectangular cross section. A bulge 25 is formed in the housing 17, within which a turbine-pump blading 10″ is located. Electrical coils 18 which may, again, be made of super conductive materials, suitably cooled, are arranged along the housing 17 (FIG. 4) to provide radial magnetic fields H. They are electrically interconnected in such a manner that the radial magnetic field H will alternate, from one coil to the next, as illustrated by force lines 20. Conductive zones, formed as contacts 19 and having the forms of sectors or portions are placed between the sidewalls of the circular housing 17, at facing sides thereof and transversely to the location of the coils (See FIG. 5), to provide electrical connection to the conductive fluid within space 1″. The sector-shaped contact elements may replace insulating material of the circular fluid housing 17. For each coil two contact elements are provided, one input and one output, in a direction perpendicular to the magnetic field, as seen in FIG. 5. These contacts may be series connected by interconnecting lines not shown, with other contacts associated with other coils 18 in such a manner that current will alternatively circulate first in one direction, then in the other under different coils. Thus, the combined action of the magnetic field generated by the coils, and of the current will cause fluid within space 1″ to circulate, imparting mechanical drive power to blading 10″ in bulge 25. Fluid motion will be unidirectional; since the flux, as seen in FIG. 4 at 20, cancels between two coils, eddy current and other stray current losses are reduced to a minimum.

The apparatus of FIGS. 2, 3 and FIGS. 4, 5 is reversible; turbine wheel 10 may be replaced just as well by a pump blading, or by combination blading for alternative use, so that the dynamoelectric machine of all embodiments can be operated either as a motor, or as a generator, with current being supplied to the electrodes formed as conductive zones on the housing holding the liquid material, or current being obtained therefrom when operating as a generator.

The cross-sectional shape of the device in accordance with FIG. 4 can be varied to suit various design requirements; likewise, the shape of the housings for the liquid subjected to the magnetic field is governed by design requirements and may differ from those illustrated in the drawings without departing from the inventive concept.

We claim:

1. Homopolar dynamoelectric machine comprising:
   a fluidtight housing composed of a closed ring having sidewalls of insulating material and inner and outer closing walls, the inner and the outer closing walls being at least partly of conductive material and forming conductive zones in said housing;
   a conductive fluid adapted to circulate in said housing;
   an annular magnetic coil concentric with said ring, to provide a toroidal magnetic field cutting said housing and hence said conductive fluid therein;
   means interconnecting said conductive contact zones with an electrical circuit to establish contact of said circuit with said fluid, said fluid forming a rotor of said dynamoelectric machine; and
   a rotor with blades of insulating material thereon and with radially conductive filaments secured to said blades to provide transfer of motive power between said rotor and fluid in said housing, said power transfer being from said rotor to said fluid when operating as a generator with electrical power output being applied to the interconnecting means, and from said fluid to said rotor when current is supplied to said interconnecting means and hence to said conductive zones, said dynamoelectric machine then operating as a motor; said rotor being located within said housing concentric with said ring and the shaft of said rotor forming the inner wall of said ring.

2. Machine according to claim 1 wherein said magnetic means comprises super conductive coils in a cryostatic housing.

3. Homopolar dynamoelectric machine comprising
   a fluidtight housing formed of a ring-shaped tube of insulating material and conductive contact zones inserted in said housing and formed of facing conductive sectors in said tube and located transverse to the magnetic fields created by coils surrounding said tube and spaced therealong and creating radially directed magnetic field across the tube;
   a conductive liquid fluid adapted to circulate in said housing;
   means interconnecting said conductive contact zones with an electrical circuit to establish contact of said circuit with said fluid, said fluid forming a rotor of said dynamoelectric machine;
   a rotor with blades thereon, said rotor being mounted in said tube to be driven by fluid circulating therein to provide transfer of motive power between said rotor and the fluid circulating in said housing, said power transfer being from said rotor to said fluid when operating as a generator with electrical power output being applied to the interconnecting means, and from said fluid to said rotor when current is supplied to said interconnecting means and hence to said conductive zones, said dynamoelectric machine then operating as a motor.

4. Machine according to claim 3 wherein said ring-shaped tube has an enlarged bulge, said rotor being located in said bulge.

5. Machine according to claim 3 wherein said magnetic means comprises super conductive coils in a cryostatic housing.